S. G. DOWN.
PRESSURE RETAINING DEVICE.
APPLICATION FILED NOV. 18, 1916.
1,295,012.
Patented Feb. 18, 1919.
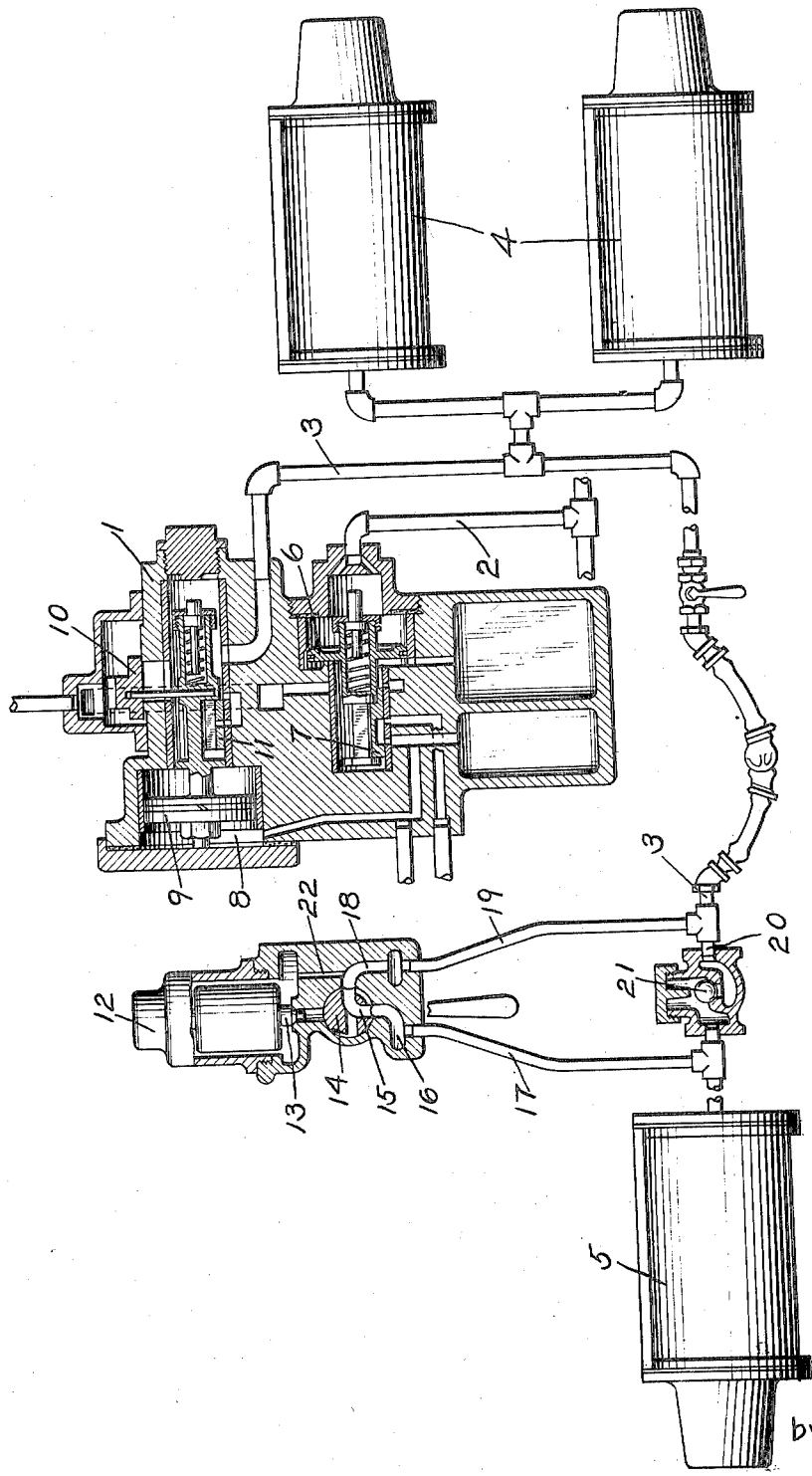
INVENTOR
Sidney G. Down
by Wm. M. Cady
Atty.

UNITED STATES PATENT OFFICE.

SIDNEY G. DOWN, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

PRESSURE-RETAINING DEVICE.

1,295,012.

Specification of Letters Patent. Patented Feb. 18, 1919.

Application filed November 18, 1916. Serial No. 132,037.

*To all whom it may concern:*

Be it known that I, SIDNEY G. DOWN, a citizen of the United States, residing at Berkeley, in the county of Alameda and State of California, have invented new and useful Improvements in Pressure-Retaining Devices, of which the following is a specification.

This invention relates to fluid pressure brakes and has for its principal object to provide means for retaining fluid pressure in one of a plurality of connected brake cylinders, such as the tender brake cylinder of a locomotive brake equipment.

In the accompanying drawing, the single figure is a diagrammatic view, partly in section, of a locomotive brake equipment, showing my invention applied thereto.

The brake equipment shown in the drawing comprises a distributing valve device 1, connected to brake pipe 2, and by pipe 3 to locomotive brake cylinders 4 and a tender brake cylinder 5.

The distributing valve device 1 includes the usual equalizing valve device having piston 6 subject to pressure from brake pipe 2 and slide valve 7 for controlling the pressure in application cylinder 8 containing piston 9 which is adapted to operate a brake cylinder supply valve 10 and a release valve 11.

The apparatus above described has heretofore been employed, and in addition, according to my invention, a retaining valve device 12 is provided for retaining fluid pressure in the tender brake cylinder, comprising a weighted valve 13 and a manually operated cock 14 having a branched port 15 adapted in one position of the cock to connect passage 16 and pipe 17 leading to tender brake cylinder 5 with passage 18 and pipe 19 leading to pipe 3. In another position of the cock, the port 15 connects passage 16 with the retaining valve 13 and the passage 18 is cut off.

The pipe 3 is also connected to the brake cylinder 5 through a by-pass pipe 20 containing a check valve 21 for preventing back flow from the brake cylinder to the pipe 3.

In operation, if it is desired to apply and release the brakes without retaining fluid pressure in the tender brake cylinder, the cock 14 is turned to the position shown in the drawing, so that fluid under pressure is supplied to and released from the tender brake cylinder by way of pipe 17, passage 16, port 15, passage 18, and pipe 19, by the usual operation of the distributing valve device 1. If it is desired to retain fluid pressure in the tender brake cylinder, the cock 14 is turned so that port 15 connects passage 16 with the retaining valve 13.

When the brakes are now applied, fluid under pressure is supplied through pipe 3 to the locomotive brake cylinders 4 and through by-pass 20 past check valve 21 to the tender brake cylinder 5.

Upon releasing the brakes, fluid is released from the pipe 3 and the locomotive brake cylinders 4. From the tender brake cylinder 5, fluid in excess of the lifting pressure of the retaining valve 13 is vented by the lifting of said valve, through passage 22, passage 18, and pipe 19 to pipe 3 and then the valve closes, so that the remaining fluid pressure in the brake cylinder is retained.

By means of the above described construction, it will be seen that fluid pressure can be retained in one of a plurality of connected brake cylinders, without interfering with the application and release of the brakes in the other brake cylinders.

Having now described my invention, what I claim as new and desire to secure by Letters Patent, is:

1. In a fluid pressure brake, the combination with a plurality of brake cylinders and an application and release pipe constantly connected to one brake cylinder, of a retaining valve and a cock having one position for connecting another brake cylinder to the application and release pipe and another position for connecting said brake cylinder to the retaining valve.

2. In a fluid pressure brake, the combination with a plurality of brake cylinders and an application and release pipe constantly connected to one brake cylinder, of a retaining valve for controlling the release of fluid from another brake cylinder to the application and release pipe and a by-pass for supplying fluid from the application and release pipe to said brake cylinder and containing a check valve for preventing back flow.

3. In a fluid pressure brake, the combination with a plurality of brake cylinders and an application and release pipe constantly connected to one brake cylinder, of a retaining valve for controlling a communication from another brake cylinder to said pipe and a cock adapted in one position to cut off communication from said brake cylinder through the retaining valve and to connect said brake cylinder with the application and release pipe.

4. In a fluid pressure brake, the combination with a plurality of brake cylinders and an application and release pipe constantly connected to one brake cylinder, of a retaining valve for controlling a communication from another brake cylinder to said pipe and a cock adapted in one position to establish communication from said brake cylinder through the retaining valve to said application and release pipe and in another position to cut off said communication and connect said brake cylinder directly to said pipe.

5. In a fluid pressure brake, the combination with a plurality of brake cylinders having a common application and release pipe, of a retaining valve for controlling a communication from one brake cylinder to the application and release pipe, a cock having one position for connecting said brake cylinder with the retaining valve and another position for connecting the brake cylinder directly with said pipe, and a by-pass pipe through which fluid is supplied from the application and release pipe to said brake cylinder and containing a check valve for preventing back flow.

In testimony whereof I have hereunto set my hand.

SIDNEY G. DOWN.